United States Patent [19]
Lynch

[11] 3,827,715
[45] Aug. 6, 1974

[54] PYROTECHNIC GAS GENERATOR WITH HOMOGENOUS SEPARATOR PHASE

[75] Inventor: Robert W. Lynch, Fountain Valley, Calif.

[73] Assignee: Specialty Products Development Corporation, Cleveland, Ohio

[22] Filed: Apr. 28, 1972

[21] Appl. No.: 248,738

[52] U.S. Cl. ............ 280/150 AB, 23/281, 102/39, 102/102, 149/2, 220/24.2, 280/87 R
[51] Int. Cl. ............................................. B60r 21/08
[58] Field of Search ............... 280/150 AB; 60/254; 102/102, 39; 149/2; 23/281; 220/24.2, 24.3

[56] References Cited
UNITED STATES PATENTS

| | | | |
|---|---|---|---|
| 3,389,025 | 6/1968 | Nix | 102/102 |
| 3,450,414 | 6/1969 | Kobori | 280/150 AB |
| 3,532,360 | 10/1970 | Leising | 280/150 AB |
| 3,606,377 | 9/1971 | Martin | 280/150 AB |
| 3,618,981 | 11/1971 | Leising | 280/150 AB |
| 3,666,289 | 5/1972 | Magyar | 280/150 AB |
| 3,680,884 | 8/1972 | Stephenson | 280/150 AB |
| 3,692,495 | 9/1972 | Scaneiter | 280/150 AB |

*Primary Examiner*—David Schonberg
*Assistant Examiner*—John P. Silverstrim
*Attorney, Agent, or Firm*—Christie, Parker & Hale

[57] ABSTRACT

A pyrotechnic gas generator in an automobile passenger restraint bag system is described. The preferred arrangement in the automobile steering wheel inflates a driver restraint bag in about 25 milliseconds with a deflagration granular propellant of low net heat output. To raise the burn rate for the cool propellant an inert non-crushable solid separator phase such as steel balls is uniformly dispersed in the propellant and immobilized for inhibiting segregation of the propellant and separator phase. In one embodiment the gas generator cavity is completely filled with steel balls having the granular propellant dispersed therebetween. The separator phase also withdraws heat from the resultant gas and freezes out nongaseous reaction products.

14 Claims, 3 Drawing Figures

PATENTED AUG 6 1974  3,827,715

PYROTECHNIC GAS GENERATOR WITH HOMOGENOUS SEPARATOR PHASE

BACKGROUND

Government regulations are requiring automobile manufacturers to provide passive restraint devices for automobile passengers in case of a collision, and an inflatable bag between the passenger and the dashboard or the driver and the steering wheel appears suitable. Impact sensors are provided in the automobile and when a collision occurs, a gas system is activated for rapidly inflating the passenger restraint bag. Some such systems have employed stored pressurized gas which is suddenly released into the bag. Such systems have required very high pressures to obtain sufficient gas in a small enough volume. The stored volume of gas must be fairly high to compensate for the significant cooling that occurs upon rapid depressurization of the gas.

According to another technique, a propellant is burned to generate quantities of gas which are used to inflate the bag. Such gasses must enter the bag at a sufficiently low temperature that no injury occurs either to the passenger or to the bag. For similar reasons, hot particles must be prevented from entering the bag. The gases that enter the bag are dissipated in the passenger compartment of the automobile and it is therefore necessary that they be nontoxic and substantially free of smoke. The time intervals for inflating the bag are very small and propellants that burn rapidly at a controlled rate are necessary. Some systems have used a hybrid arrangement with a combination of pressurized gas and combustible propellant, however, these are complex.

To obtain high volumes of nontoxic gasses, a variety of deflagration propellants have been devised which react strong oxidizers with various organic materials. These combustions typically yield principally carbon dioxide and water vapor, often with an excess of oxygen for avoiding asphyxiation. In the progress of developing such propellants for practical systems, granular or powder mixtures of various oxidizers and organic materials have been provided. The net heat of reaction of the propellants has been steadily reduced in order to keep the temperature of gasses entering the passenger restraint bag as low as possible. Other techniques have been employed, such as passing the reaction gasses through porous heat exchangers for reducing gas temperature. As the net heat of reaction has decreased there has been a concomitant reduction in the rate of reaction and consequently some increase in the time required for inflating a passenger restraint bag.

A system for inflating a passenger restraint bag for the right front seat of an automobile can be relatively large because of the available space behind the dashboard. It is also found that the time for inflating a passenger restraint bag in this position can be in the order of 50 milliseconds or longer and still perform quite well. The problem of providing restraint for the driver of the vehicle is more difficult since the stored restraint bag and its inflation system must be accommodated in the steering wheel. Preferably this entire system is accommodated within its existing size envelope of the steering wheel. Despite the small envelope available, the gas generator for the driver restraint bag must have all the performance characteristics of the passenger restraint bag, including low temperature gas, and freedom from hot particles and substantial smoke. The problem is further complicated in that the driver restraint bag must typically completely inflate in about 25 milliseconds, and some of the low net heat of reaction propellants are not inherently sufficiently rapid for such use.

It is therefore desirable to provide a gas generator that produces low temperature gas and is free of hot particles and smoke which can completely react in 25 milliseconds or less and still fit within the confines of a conventional size steering wheel.

BRIEF SUMMARY OF THE INVENTION

There is, therefore, provided in practice of this invention according to a presently preferred embodiment, a pyrotechnic gas generator having a granular deflagration gas generator propellant in a housing. An inert noncrushable solid separator phase is uniformly dispersed in the propellant and immobilized for inhibiting segregation of the propellant and the separator phase. The separator phase serves to decrease the effective cross section of the propellant, thereby significantly raising the gas generation rate. The separator phase serves the additional function of absorbing heat from the reaction for cooling the gasses and condensing nongaseous reaction products.

DRAWINGS

These and other features and advantages of the present invention will be appreciated as the same becomes better understood by reference to the following detailed description of a presently preferred embodiment when considered in connection with the accompanying drawings wherein.

DESCRIPTION

Figure 1:
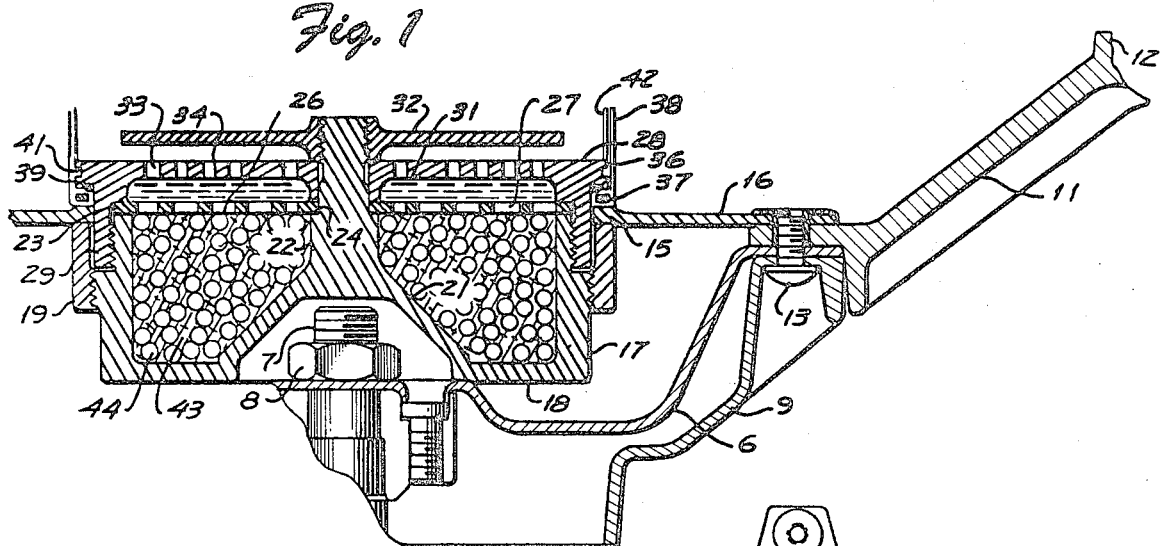
FIG. 1 illustrates in transverse cross section a gas generator constructed according to principles of this invention, mounted in an automobile steering wheel.
Figure 2:
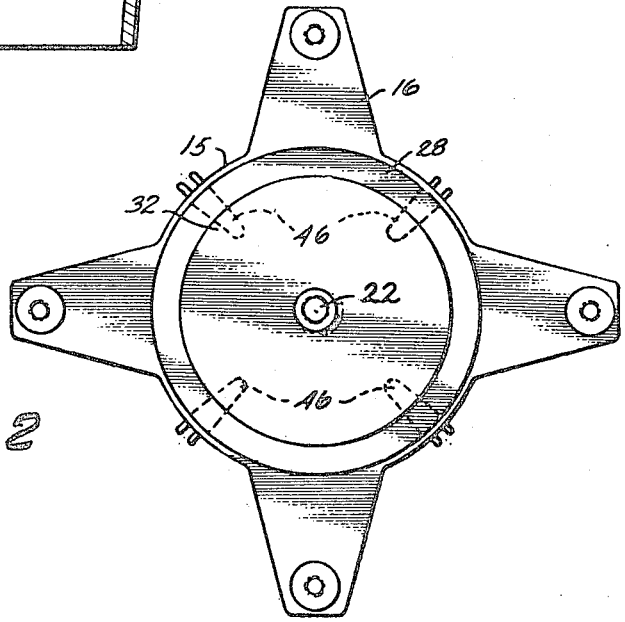
FIG. 2 is a front view of the gas generator.

FIG. 1 illustrates in fragmentary cross section an automobile steering wheel fitted with a gas generator constructed according to principles of this invention. As illustrated in this embodiment the steering wheel has a steel hub 6 which is connected to the steering shaft 7 by a nut 8. A decorative bonnet 9 fits beneath the hub for covering the end of the steering column and also providing some structural rigidity. Spokes 11 connect the rim 12 of the wheel to the hub by a series of bolts 13. This structure of the wheel itself is quite conventional and varies somewhat from one model of car to another. A decorative cover and horn actuating mechanism are typically includes in a steering wheel but are omitted from the drawings as they form no part of this invention.

A spider 15 is mounted in the center of the steering wheel with its four legs 16 secured to the steering wheel by the bolts 13. The spider 15 has a central circular aperture in which the gas generator is mounted. The gas generator has a housing 17 having a flat back portion 18 that abuts a portion of the hub 6. A nut ring 19 is threaded on to the exterior of the housing 17 to butt against the back side of the spider 15. The housing also has a central conical web 21 leading to an axial shaft 22. The conical web 21 provides a depression on the back side of the generator to clear the end of the steering shaft 17.

A nozzle plate 23 rests on the open end of the housing 17 and is also centrally supported by a shoulder 24 on the housing shaft 22. A hermetic seal 26 is sandwiched between the nozzle plate and the housing to protect the contents of the gas generator until it is ignited. The nozzle plate has a number of holes 27 to permit gasses to flow from the interior of the gas generator when it is used. A distributor 28 has a peripheral extension 29 threaded on to an exterior portion of the housing 17 for firmly gripping the nozzle plate and holding it in position. A central hub 31 on the distributor bears against the central portion of the nozzle plate. A deflector plate 32 is threaded on the end of the housing shaft 22 to provide additional mechanical support in the center of the housing.

The distributor is provided with a plurality of holes 33 in the region beneath the deflector plate 32. The deflector prevents gas from flowing in a straight line from the holes against the inflatable bag. A number of steel screens 34 are sandwiched between the nozzle plate 23 and the distributor 28 to serve as a permeable diffuser. In a typical embodiment the screens may be a stack of one 10 mesh screen, three 100 mesh screens, one 10 mesh screen, another three 100 mesh screens and finally one 10 mesh screen. If desired in lieu of the stack of steel screens, a porous metal or ceramic diffuser insert can be used.

An overhanging lip 36 around the distributor 28 captures a steel ring 37 imbedded around the opening of a conventional inflatable passenger restraint bag 38. If desired an O-ring 39 can be provided in the lip 36 to insure a better gas seal and minimize the possibility of cutting the inflatable bag. The illustrated embodiment has an optional feature in the form of a peripheral groove 41 in which the edge of a glass fabric sock 42 is fitted to provide mechanical protection for the inflatable bag. The glass fabric sock protects the bag from direct gas impingement.

A homogenous mixture of a granular propellant 43 and steel balls 44 is packed into the housing 17 and protected from the environment by the hermetic seal 26. In one embodiment the steel balls are, for example, about 5/32 inch diameter and the propellant 43 which is in the form of granules or powder with a grain size of less than about 25 microns is in the interstices between the balls. Four conventional electric initiators 46 extend through the sidewalls of the housing 17, such electric initiators are conventional and respond to the impact sensors (not shown) for igniting the propellant. Thus when an impact is sensed the initiators are fired, igniting the propellant in the housing. As the propellant burns a large volume of gas is produced which destroys the hermetic seal and flows through the holes 27 in the nozzle plate 23. The gas then flows through the diffuser screens 34 which assure that no hot particles reach the inflatable bag and incidentally extract some heat from the gas. The gas then flows through the holes 33 in the distributor and is deflected by the deflector plate 32 so that it is not directed in the face of the automobile driver. The gas inflates the glass fabric sock 42 and the inflatable bag 38.

The granular propellant in the gas generator can be any of a broad variety of deflagration mixtures. Typically such mixtures comprise mixed powders of a strong oxidizing agent and an oxygen bearing organic material. Typical oxidizing agents include the chlorates and perchlorates of the alkali metals and alkaline earth metals. Typical organic components of the propellant include a variety of carbohydrates such as sucrose, starch or the like; organic acids, such as formic acid, tartaric acid and the like; and oxygen bearing metal organic compounds such as the alkali metal and alkaline earth metal formates, oxalates and acid oxalates, for example. Such propellant mixtures are typically in the stoichiometric proportion or are more rich in the oxidizer so that an excess of oxygen is included in the gasses produced upon deflagration of the propellant. These materials are homogeneously mixed together as powders of the two or more ingredients of the composition and preferably the granular or powder size is less than about 25 microns for obtaining rapid and thorough combustion.

A problem arises with granulated propellants since, as the propellant powder burns, the pressure in the gas generator increased rapidly. The unburned powder is compacted to high density by the resultant pressure wave so that it performs much in the manner of a compact propellant grain and the burning rate decreases sharply. For many embodiments involving inflation times in the order of 50 to 100 milliseconds, granulated powders perform quite well. In the case of a steering wheel inflatable restraint system, however, it is desired to inflate the bag in 25 milliseconds or less which requires that the propellant in the gas generator be completely burned in this time.

The flow rate of gas out of a gas generator is the product of the surface area that is actually burning, the burning rate and the density of the propellant. The desirable deflagration propellants having low net heat output have low burning rate when in a high density form. To maximize the gas flow rate it is desirable to maximize the burning surface area.

The total time required to burn substantially all of the propellant is determined by the thickness of the propellant to be burned divided by the burning rate. Since the burning rates are low in the preferred propellants, decrease of the burn time involves minimization of the web thickness of the propellant. In high energy explosives, gun powder and the like, web thickness is decreased and surface area increased by perforating solid particles of the explosive. Since the granular propellants preferred for an automobile passenger restraint gas generator system comprise mixtures of very fine powders perforation of the grains is impractical. The burning rates between explosives and granular propellants are also many orders of magnitude different, and pressure wave crushing of explosives is not a problem.

It has been found in practice of this invention that one can achieve a maximum burning surface and a minimum web thickness by dispersing an inert noncrushable solid separator phase uniformly in the granular propellant. This separator phase should be immobilized for inhibiting segregation of the propellant and the separator phase. The steel balls mixed with the granular propellant and packed into the housing as illustrated hereinabove form a suitable gas generator. The steel balls form a separator phase substantially completely filling the housing of the gas generator so that they interact with each other and cannot all drift to one side of the housing leaving a propellant at the other side. If a quantity of steel balls less than sufficient to fill the housing were present, segregation of the mixture of propellant and steel balls could occur. Other techniques can be employed for immobilizing the separator phase, such as, for example, providing an adhesive that secures the balls in a rigid matrix having the granulated powder dispersed therein.

Since the steel balls extend substantially continuously between the boundaries of the housing and have relatively high strength they do not crush or compact under the pressure of the burning propellant. Since the propellant is present only in the interstices between the steel balls its average web thickness is considerably decreased as compared with merely filling the entire volume with granulated propellant. To keep the web thickness of reasonable size, the separator phase should have a substantial portion of its cross section much greater than the grain size of the propellant. Since the noncrushable matrix of steel balls holds the propellant apart the exposed surface area for burning is significantly increased. Thus the noncrushable solid inert separator minimizes the web thickness of propellant and increases the burning surface area thereby enhancing the rate of gas flow from the generator and minimizing the total burning time.

As one example, a gas generator as illustrated hereinabove was charged with 130 grams of a powdered propellant and 1,000 grams of 5/32 inch steel balls. Experience showed that the propellant employed in this test required hundreds of milliseconds to burn to completion under ordinary gas generator conditions. In the test wherein the granulated propellant was separated by the steel balls the entire reaction was completed in less than about 15 milliseconds.

Steel balls are not the only separator phase suitable for decreasing web thickness and increasing burning surface of granular propellants. Cylinders of alumina about 0.1 inch diameter and 0.15 inch long have also proved to be suitable. The beads of alumina each had an axial hole, however, it is not believed that this had any significant effect on the function of the separator phase. Another separator phase found suitable comprises short lengths of metal wire or strip, each of which is bent so that the resultant matrix of wires or strips is not crushable. In a similar manner a matrix of wire chain forms a suitable separator phase. Still another suitable separator phase is formed of a pack of relatively coarse machining chips of steel or other suitable metal. The curly chips can be tightly packed in a gas generator to be noncrushable. If desired, pre-forms having a regular or irregular array of passages and large enough that it fits into the housing can be used. Coarse screens or other suitable inert noncrushable separator phases may also be employed in practice of this invention.

The solid separator phase uniformly distributed in the propellant also serves the very valuable function of extracting heat from the reaction products. Because of this the temperature of gas flowing from the gas generator to the inflatable bag is significantly lower than is readily obtainable by other techniques. The separator phase also provides a place for condensation of nongaseous reaction products. Thus, for example, when a metal chlorate or perchlorate reacts with a metal bearing organic compound a low melting slag is formed. This slag may condense in tiny particles and appear as smoke in the passenger restraint bag. It may also occur as relatively larger hot particles that enter the inflatable bag, and a substantial portion of the slag usually condenses on gas generator surfaces. When a solid separator phase is provided in the propellant, its extraction of heat from the reaction causes condensation of the slag on the separator phase thereby preventing smoke and hot particles from entering the inflatable bag.

By varying the dimensions of the separator phase and hence of the interstices between the elements of the separator phase, significant variations can be made in the rate of gas generation and the total burning time. Assuming for a simple example that the separator phase comprises a pack of metal balls, it will be apparent that a few large balls would leave relatively large interstices and the total time required for burning would increase and the rate of gas evolution would both be decreased as compared with the example given above. Conversely as smaller balls are used, the interstices are smaller and the burn time is decreased while the gas evolution rate is increased. Variation in the surface-to-volume ratio of the separator phase also permits a degree of control of the heat transfer characteristics between the reaction products and the separator phase. Thus relatively small diameter wires may be more effective heat recipients than large balls.

Figure 3:
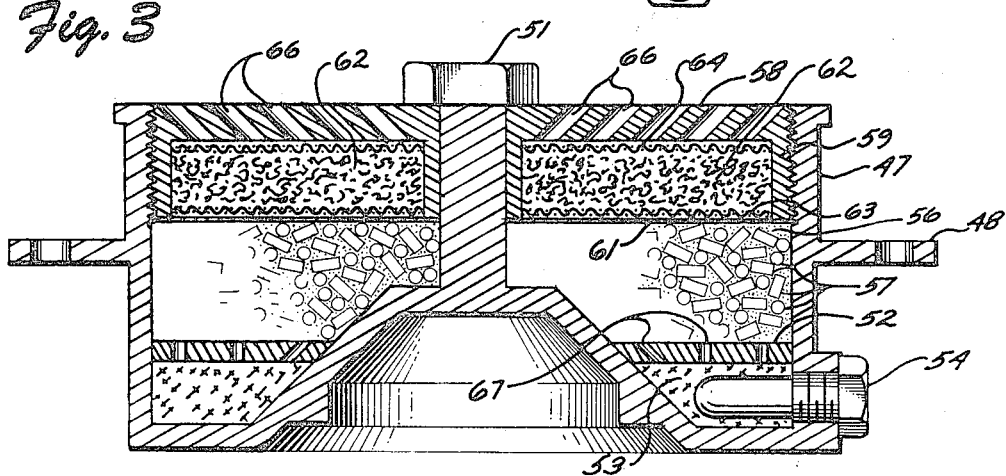
FIG. 3 illustrates in transverse cross section another embodiment of gas generator.

FIG. 3 illustrates in transverse cross section another embodiment of gas generator constructed according to principles of this invention. The gas generator has a generally circular steel body 47 which may be connected in a conventional steering wheel by a number of ears 48. The gas generator is generally similar to that illustrated in FIG. 1 and would mount in a steering wheel in substantially the same manner, thus for just one example the body includes a central post 49 onto which a nut 51 is threaded for holding the generator together.

A steel plate 52 is welded into the body and divides the interior thereof into two sections. The lower chamber is packed with an igniter mix 53 which may, for example, be a rapidly burning mixture of a strong oxidizing agent and an oxygen bearing organic material as described hereinabove preferably this propellant mixture burns quite rapidly. A conventional electrical initiator 54 is threaded through one side of the generator body so as to be in contact with the propellant mixture 53. In a typical embodiment about five grams of the propellant mixture poured into the lower chamber through the initiator hole is sufficient.

Much of the interior of the gas generator body is packed with a granular propellant 56 having a separator phase 57 dispersed therein. The granular propellant may be any of those described hereinabove. The dispersed noncrushable separator phase in the embodiment illustrated in FIG. 3 comprises ceramic beads in the form of hollow cylinders of the type commonly used for insulating thermocouples.

A distributor plate 58 having a rim 59 is threaded into the gas generator body 47, a paper or plastic sheet seal 61 protects the propellant composition 56 from the environment. The space within the rim 59 of the distributor plate is packed with steel machining chips 62, these chips are short curly pieces of steel that pack into a permeable random arrangement from one to three 100 mesh steel screens 63 separate the chips 62 from the seal, another 100 mesh screen 64 is immediately adjacent to the distributor plate.

The distributor plate is provided with a number of holes 66, the axis which extend outwardly at an angle of about 45° from the axis of the gas generator. The inflatable bag (not shown) fits over this end of the gas generator and when it is fired the gasses stream through the holes 66. By angling the holes outwardly the need for a deflector plate may be avoided. The gasses coming through the holes are not directed to the face of the driver nor do they stream directly into the central portion of the bag, this reduces the initial deployment velocity of the bag to a safe limit.

When the initiator 54 is fired, the propellant mixture 53 ignites and rapidly burns. The high temperature gasses from this combustion flow in a plurality of hot jets through orifices 67 in the orifice plate 52. These hot jets of gas ignite the propellant mixture 56 in the main body of the gas generator over a large area for rapid and uniform combustion. The gasses produced by combustion of the granular propellant in the main body of the generator lose much of their heat and nongaseous material by interaction with the ceramic beads of the separator phase. The gasses rupture the seal 61 and flow through the screens 63 and 64, as well as the porous body of machining chips 62. Additional heat and nongaseous reaction products are lost as this occurs. The gasses then flow through the angled hole 61 into the inflatable bag.

The steel chips between the screens are advantageous since they are quite economical and the randomly varying path that the gas must follow through the pack of chips apparently effectively separates any particles remaining after the propellant combustion. The ceramic beads as a separator phase are desirable since they have lower weight than the steel balls hereinabove described and illustrated in the embodiment of FIG. 1.

Although limited embodiments of gas generator having a separator phase dispersed in the granular propellant have been described and illustrated herein, many modifications and variations will be apparent to one skilled in the art. Thus, for example, the principle can be used for enhancing the burn time and increasing the gas generation rate for a broad variety of deflagration propellants. The principle can be used in a variety of embodiments where low temperature gas generating is desired in short time intervals. Many other modifications and variations will be apparent to one skilled in the art and it is therefore to be understood that within the scope of the appended claims the invention may be practiced otherwise than as specifically described.

What is claimed is:

1. An automobile driver restraint system comprising:

a generally cylindrical housing closed on one end and open on its other end;
   means for mounting the housing in the hub of an automobile steering wheel for rotation therewith;
   an axial shaft in the housing and integral therewith extending from the closed end towards the open end;
   a plate member for closing the open end of the housing connected to the housing around its periphery, said member including gas passage means leading from the interior of the housing to the exterior thereof; and
   means for interconnecting the axial shaft and the plate member.

2. An automobile driver restraint system comprising:

a cylindrical housing;
   an axial shaft in the housing;
   a plate enclosing one end of the housing;
   means for mounting the housing in the hub of an automobile steering wheel;
   a flexible inflatable bag connected to the housing;
   a gas generating deflagration propellant in the housing;
   means for igniting the propellant;
   a plurality of gas passages comprising orifices through the plate leading from the housing into the interior of the bag;
   a gas permeable diffuser adjacent the passages; and
   a deflector plate mounted on the axial shaft opposite the passages for preventing straight line impingement of gas therefrom on the bag.

3. A driver restraint system as defined in claim 2 wherein the means for mounting comprises a spider connectible to an automobile steering wheel and including a central aperture; and wherein the housing includes a peripheral nut ring for clamping against the spider.

4. A driver restraint system as defined in claim 3 wherein the gas passages through a plate comprise a distributor plate having a plurality of orifices therethrough and a nozzle plate spaced apart from the distributor plate and having a plurality of orifices therethrough and wherein the diffuser is between the distributor plate and the nozzle plate.

5. A driver restraint system as defined in claim 4 further comprising an inert noncrushable solid separator phase distributed in the propellant and immobilized for inhibiting segregation of the propellant and the separator phase.

6. An automobile driver restraint system comprising:

a cylindrical housing;
   means for mounting the housing in the hub of an automobile steering wheel,
   a flexible inflatable bag connected to the housing;
   a gas generating deflagration propellant in the housing;
   an inert noncrushable solid separator phase distributed in the propellant and immobilized for inhibiting segregation of the propellant and the separator phase;
   means for igniting the propellant;
   a plurality of gas passages leading from the housing into the interior of the bag;
   a gas permeable diffuser adjacent the passages; and
   a deflector plate opposite the passages for preventing straight line impingement of gas therefrom on the bag.

7. A driver restraint system as defined in claim 6 wherein the gas passages each have an axis angulated relative to the axis of the housing.

8. A driver restraint system as defined in claim 7 wherein the housing includes an aperture plate dividing the housing into a propellant chamber and an igniter chamber, said deflagration propellant being in the propellant chamber and wherein
   the means for igniting the propellant comprises a high temperature gas generating propellant in the igniter chamber and an electric initiator adjacent the propellant.

9. A driver restraint system as defined in claim 8 wherein the diffuser comprises a screen adjacent the gas passages and a pack of metal machining chips adjacent the screen.

10. An automobile driver restraint system comprising:
- a generally cylindrical housing closed on one end and open on its other end;
- means for mounting the housing in the hub of an automobile steering wheel;
- an axial shaft in the housing extending from the closed end towards the open end;
- a plate member for closing the open end of the housing connected to the housing around its periphery, said member including gas passage means leading from the interior of the housing to the exterior thereof; and
- means for interconnecting the axial shaft and the plate member comprising a deflector plate opposite the gas passage means, said deflector plate being removably connected to the axial shaft.

11. An automobile driver restraint system as defined in claim 10 further comprising:
- a gas generating deflagration propellant in the housing;
- means for igniting the propellant; and
- a gas permeable diffuser between the propellant and the gas passage means.

12. An automobile driver restraint system as defined in claim 11 wherein the diffuser means comprises a screen adjacent the gas passage means and a layer of metal chips between the screen and the propellant.

13. A method for inflating an automobile passenger restraint bag comprising the steps of:
- distributing a granular deflagration propellant in the interstices of an inert noncrushable solid separator phase;
- igniting the propellant; and
- passing the gas from the propellant into an inflatable bag.

14. A method for inflating an automobile passenger restraint bag as defined in claim 13 wherein the step of distributing comprises mixing the granular propellant with a plurality of individual separator elements.

* * * * *